US007577598B2

(12) United States Patent
Rousseau et al.

(10) Patent No.: US 7,577,598 B2
(45) Date of Patent: Aug. 18, 2009

(54) ACCOUNT OPENING FACILITATION SYSTEM, METHOD AND COMPUTER PROGRAM PRODUCT

(75) Inventors: Curtis R. Rousseau, Alpharetta, GA (US); Seth D. Jaslow, Roswell, GA (US); Phil G. Lawson, Grand Junction, CO (US); Velma E. Lawson, legal representative, Grand Junction, CO (US)

(73) Assignee: United Parcel Service of America, Inc., Atlanta, GA (US)

( * ) Notice: Subject to any disclaimer, the term of this patent is extended or adjusted under 35 U.S.C. 154(b) by 1380 days.

(21) Appl. No.: 10/128,825

(22) Filed: Apr. 24, 2002

(65) Prior Publication Data
US 2003/0040997 A1 Feb. 27, 2003

Related U.S. Application Data

(60) Provisional application No. 60/287,845, filed on May 1, 2001.

(51) Int. Cl.
G06Q 40/00 (2006.01)
(52) U.S. Cl. .......................................... 705/35; 705/38
(58) Field of Classification Search .................. 705/35, 705/38
See application file for complete search history.

(56) References Cited

U.S. PATENT DOCUMENTS

| | | | |
|---|---|---|---|
| 4,908,770 A | 3/1990 | Breault et al. | |
| 5,826,241 A | 10/1998 | Stein et al. | |
| 5,826,243 A | 10/1998 | Musmanno et al. | |
| 5,884,271 A | 3/1999 | Pitroda | |
| 5,907,831 A | 5/1999 | Lotvin et al. | |
| 5,940,811 A | 8/1999 | Norris | |

(Continued)

FOREIGN PATENT DOCUMENTS

JP    10187835    7/1998

(Continued)

OTHER PUBLICATIONS

Bank of America Plans Branch Push For New Revenue By Carrick Mollenkamp and Paul Beckett. Wall Street Journal. (Eastern edition). New York, N.Y.: Aug. 25, 2000. p. C.1.*

(Continued)

*Primary Examiner*—Lalita M Hamilton
(74) *Attorney, Agent, or Firm*—Alston & Bird LLP

(57) ABSTRACT

A system for facilitating the opening of accounts by a plurality of backend systems. The account opening system includes a front-end interface that interacts with a customer to collect customer information such as an account-type selection, billing information and pickup location information. A backend interface of the system pre-validates the customer information and routes the customer information to the backend systems for activation of the account. The backend interface also includes a monitor that determines the availability of the backend systems and a cache that stores the open account request and customer information for later routing when the backend systems are temporarily unavailable. Advantageously, pre-validation of the customer information allows the backend interface to distribute an account number to the customer in real time when the backend systems are unavailable. Pre-validation ensures that the customer information is sufficiently correct to allow later activation of the account by the backend systems.

12 Claims, 19 Drawing Sheets

U.S. PATENT DOCUMENTS

| | | |
|---|---|---|
| 5,963,921 A | 10/1999 | Longfield |
| 5,991,381 A | 11/1999 | Bouanaka et al. |
| 6,023,698 A | 2/2000 | Lavey, Jr. et al. |
| 6,031,136 A | 2/2000 | Brake, Jr. et al. |
| 6,061,660 A | 5/2000 | Eggleston et al. |
| 6,064,986 A | 5/2000 | Edelman |
| 6,105,009 A | 8/2000 | Cuervo |
| 6,105,067 A | 8/2000 | Batra |
| 6,131,810 A | 10/2000 | Weiss et al. |
| 6,135,349 A | 10/2000 | Zirkel |
| 6,178,408 B1 | 1/2001 | Copple et al. |
| 6,256,614 B1 | 7/2001 | Wecker et al. |
| 6,324,524 B1 | 11/2001 | Lent et al. |
| 7,089,202 B1 * | 8/2006 | McNamar et al. ............. 705/35 |
| 7,117,172 B1 | 10/2006 | Black |
| 7,493,282 B2 * | 2/2009 | Manly et al. .................. 705/38 |
| 2001/0018672 A1 | 8/2001 | Petters et al. |
| 2001/0049286 A1 | 12/2001 | Hansmann et al. |
| 2002/0010645 A1 | 1/2002 | Hagen et al. |
| 2002/0032860 A1 | 3/2002 | Wheeler et al. |

FOREIGN PATENT DOCUMENTS

| | | |
|---|---|---|
| JP | 11-126231 A | 5/1999 |
| WO | WO 00/46728 A2 | 8/2000 |
| WO | WO-00/67178 | 11/2000 |
| WO | WO 00/73933 | 12/2000 |
| WO | WO-01/11515 | 2/2001 |
| WO | WO-01/75700 | 10/2001 |

OTHER PUBLICATIONS

Open space: Net gains The Internet is already a useful, if limited resource for helping to ease the process of property buying. But one day we may find it indispensable, says Alex Balfour Alex Balfour. The Guardian. Manchester (UK): Jan. 15, 1999, p. 004.*

Discount brokerages brave the Net and commerce trading online Price, Susan. Bank Systems & Technology. New York: May 1996, vol. 33, Iss. 5; p. 50, 1 pgs.*

Search Report for Japanese Patent Appl. No. 2002-586126, completed Nov. 7, 2006, mailed Nov. 14, 2006.

Ecommerce Solution Merchant Account; E Business/Ecommerce Review 2001-2002; Jan. 30, 2002.

The Complete Mac Online; Jan. 30, 2002.

Art cited attached Official Decision of Rejection dated Aug. 21, 2007.

Official Action from Canadian Patent Office dated Apr. 29, 2008, regarding CA patent application No. 2,445,942.

Art cited from attached Offical Decision of Rejection dated Aug. 21, 2007.

* cited by examiner

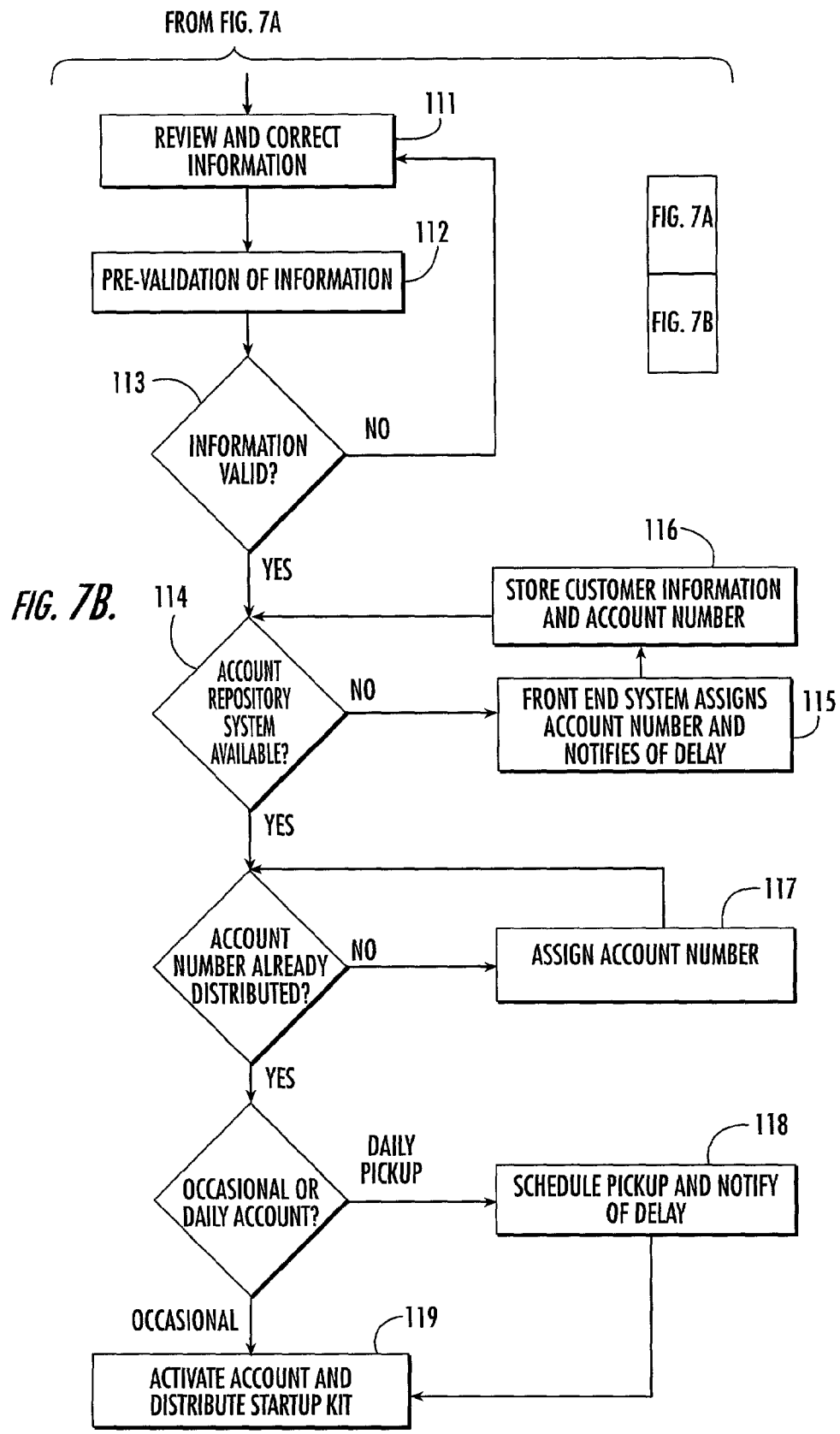

FIG. 8.
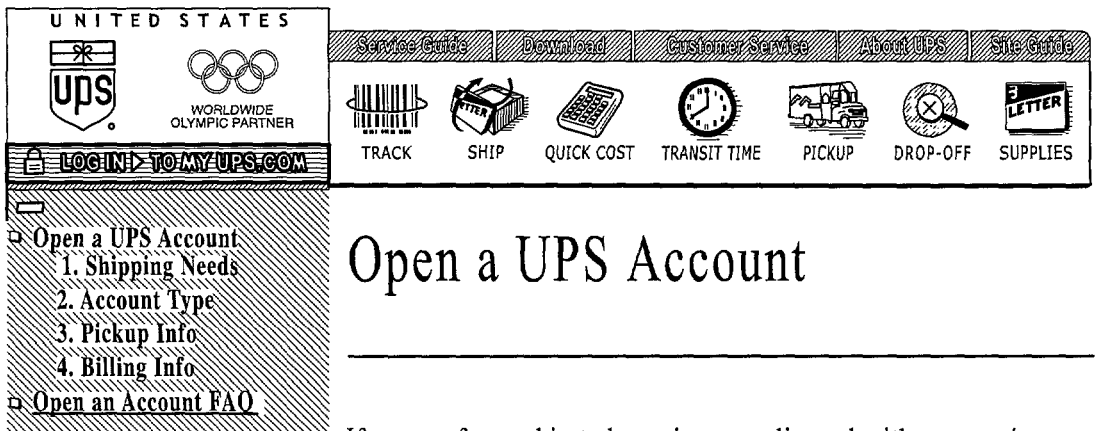
Open a UPS Account
If you prefer to ship today using a credit card without opening an account, it's quick and easy with UPS Internet Shipping.
To obtain your UPS Account Number simply follow the steps below:
1. Tell us your Shipping Needs
2. Select your Account Type
3. Enter your Pickup Location Information
4. Enter your Billing/Customer Information
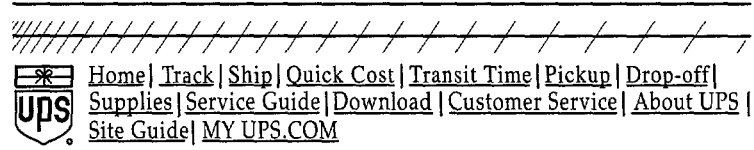

FIG. 9.

Shipping Needs

Please answer the questions below so that UPS can recommend the best type of account to meet your shipping needs.

1. How many packages/letters per week do you anticipate shipping?
   Ground ☐   Air ☐   International ☐
2. Will this account be for business or personal use?
   Business ○   Personal ○
3. Do any of the following apply to you?
   - Ship <u>Hazardous Materials</u>
   - Ship High Value or Breakable Goods (<u>see UPS Tariff Guide.</u>)
   - Act as an <u>Authorized Shipping Outlet</u>

Yes ○   No ○

CONTINUE

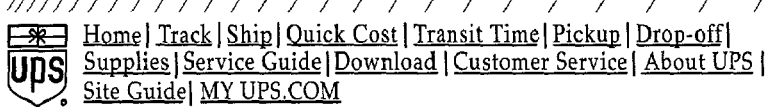

Copyright 1994-2001 United States Parcel Service of America, Inc.
All Rights Reserved. 36 USC 380. <u>Trademark and Tariff Information</u>

FIG. 10.

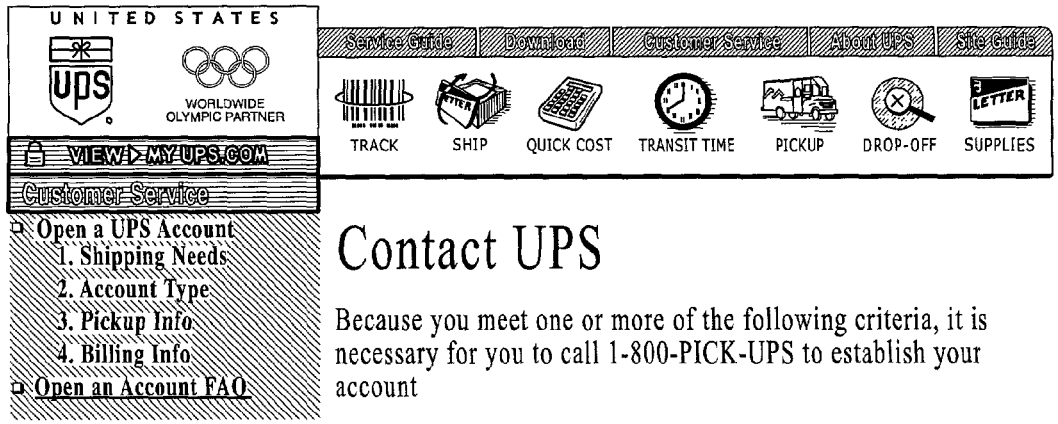

- Ship Hazardous Materials
- Ship High Value or Breakable Goods (see UPS Tariff Guide.)
- Act as an Authorized Shipping Outlet Thank you

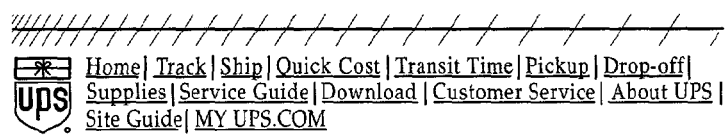

Home| Track | Ship | Quick Cost | Transit Time | Pickup | Drop-off |
Supplies | Service Guide | Download | Customer Service | About UPS |
Site Guide| MY UPS.COM Copyright 1994-2001 United States Parcel Service of America, Inc.
All Rights Reserved. 36 USC 380. Trademark and Tariff Information

FIG. 11.

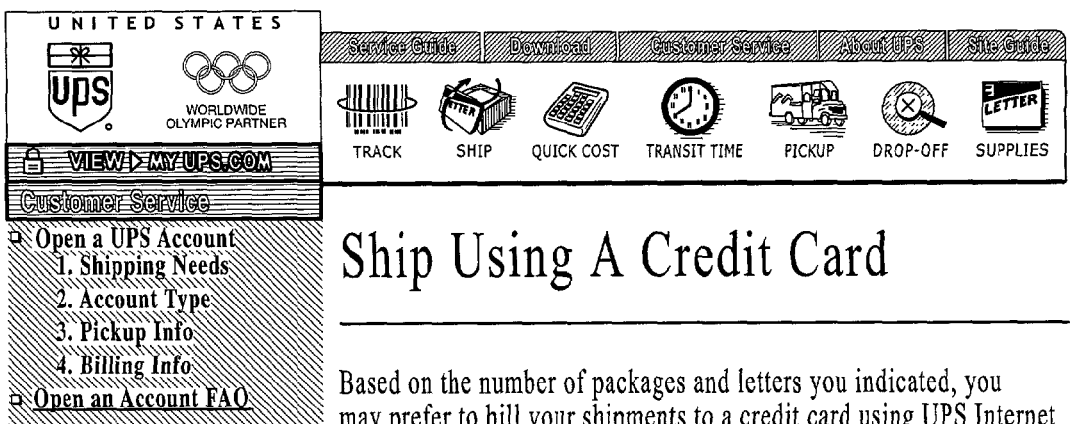

Ship Using A Credit Card

Based on the number of packages and letters you indicated, you may prefer to bill your shipments to a credit card using UPS Internet Shipping. UPS Internet Shipping is another convenient way to ship your packages whether you have a UPS account number or want to use your credit card. For more information, see Open a UPS Account FAQs.

BENEFITS:
- Shipping charges are billed to your credit card
- You can easily record and track your transportation costs A UPS driver does not make a stop at your business each day. You can take your packages to a UPS Customer Counter, UPS Letter Center, Authorized Shipping Outlet or hand them to a UPS driver, To find the nearest drop-off location, use the Drop-off Locator.

If you prefer to bill your shipments to a credit card, choose Set up Credit Card Billing to edit your Payment Method in your My UPS.COM profile.

If you would still prefer to open a UPS Account, please choose Open a UPS Account.

Home| Track | Ship | Quick Cost | Transit Time | Pickup | Drop-off|
Supplies | Service Guide | Download | Customer Service | About UPS |
Site Guide| MY UPS.COM Copyright 1994-2001 United States Parcel Service of America, Inc.
All Rights Reserved. 36 USC 380. Trademark and Tariff Information

FIG. 12.

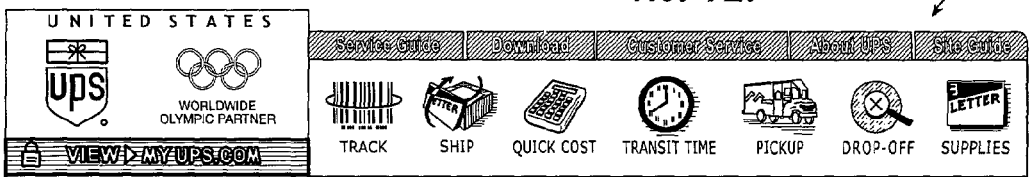

Account Type

Based on your answers to the previous questions, UPS recommends the following:

○ Daily Pickup Account

With this account a UPS driver will make a regular stop at your location each day, Monday through Friday, to pick up all packages types, including:
- Ground shipments
- Air shipments
- International shipments Note: A weekly service charge applies (range of $7 - $16 per week), and will be billed to your UPS Account.

OR

⊙ Occasional Account

With this account, a UPS driver does not make a stop at your business each day. You are responsible for providing the following package types to a UPS location.
- Ground shipments processed through UPS Internet Shipping
- Air shipments
- International shipments Note: No weekly service charge applies.

You can provide these packages to UPS Customer Counters, UPS Letter Centers, Authorized Shipping Outlets or hand them to a UPS driver. To find the nearest drop-off location, use the Drop-off Locator.

You can also schedule a pickup for air and international shipments using On Call Air Pickup.

For a ground shipment, you may schedule and bill a One-Time Pickup by calling 1-800-PICK-UPS one day in advance.

CONTINUE

Home | Track | Ship | Quick Cost | Transit Time | Pickup | Drop-off | Supplies | Service Guide | Download | Customer Service | About UPS | Site Guide | MY UPS.COM

FIG. 13.

Service Charges for Daily Pickup Accounts

The weekly service charge for a Daily Pickup Account is determined by your weekly shipping expenditures. The chart below outlines the breakdown of service charges.

| Weekly Shipping Expenditures | Amount/week |
|---|---|
| Over $50.00 | $7.00 |
| From $0.01 to $49.99 | $10.50 |
| No shipments($0) | $16.00 |

Home | Track | Ship | Quick Cost | Transit Time | Pickup | Drop-off | Supplies | Service Guide | Download | Customer Service | About UPS | Site Guide | MY UPS.COM Copyright 1994-2001 United States Parcel Service of America, Inc.
All Rights Reserved. 36 USC 380. Trademark and Tariff Information

FIG. 14.

Pickup Location Information

Please provide us with the information below about where your packages/letters should be picked up. Required fields are shown in bold.

| | |
|---:|:---|
| Pickup Point: | [ ] |
| | (e.g., Front Door, Reception, Mail Room, etc.) |
| Pickup Start Date: | Select Start Date |
| Daily Closing Time: | Select Time |
| Company Name: | [ ] |
| Contact Name: | [ ] |
| | (First and Last) |
| Contact Title: | [ ] |
| Street Address: | [ ] |
| | (e.g., 1234 South Main Street NW) |
| Rm., Fl.,Apt.,Ste.: | [ ] |
| City: | [ ] |
| State: | Select a State |
| Postal Code: | [ ] |
| Country: | United States |
| E-mail Address: | [ ] |
| Location Phone Number: | [ ] |

☐ Check here if your Pickup and Billing information are the same

CONTINUE

Home | Track | Ship | Quick Cost | Transit Time | Pickup | Drop-off | Supplies | Service Guide | Download | Customer Service | About UPS | Site Guide | MY UPS.COM Copyright 1994-2001 United States Parcel Service of America, Inc. All Rights Reserved. 36 USC 380. Trademark and Tariff Information

FIG. 15.

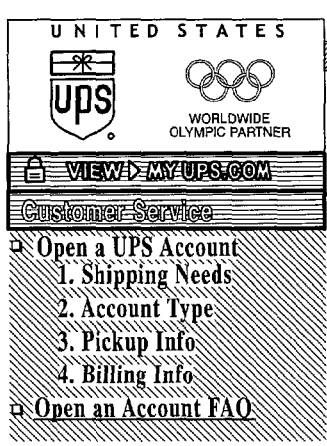
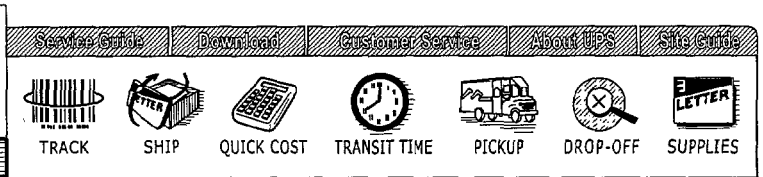

Billing Information

Please provide us with the information below about where your bill should be mailed. Required fields are shown in bold.

| | |
|---:|---|
| Company Name: | [_____] |
| Contact Name: | [_____] |
| | (First and Last) |
| Contact Title: | [_____] |
| Street Address: | [_____] |
| | (e.g., 1234 South Main Street NW) |
| Rm., Fl., Apt., Ste.: | [_____] |
| P.O. Box Number: | [_____] |
| City: | [_____] |
| State: | Select a State ▼ |
| Postal Code: | [____] |
| Country: | United States |
| E-mail Address: | [_____] |
| Company Phone Number: | [_____] |

CONTINUE

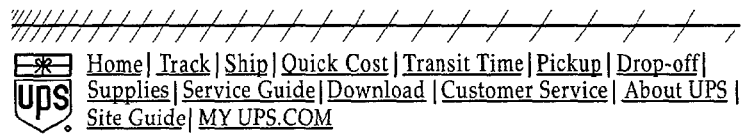

Copyright 1994-2001 United States Parcel Service of America, Inc.
All Rights Reserved. 36 USC 380. Trademark and Tariff Information

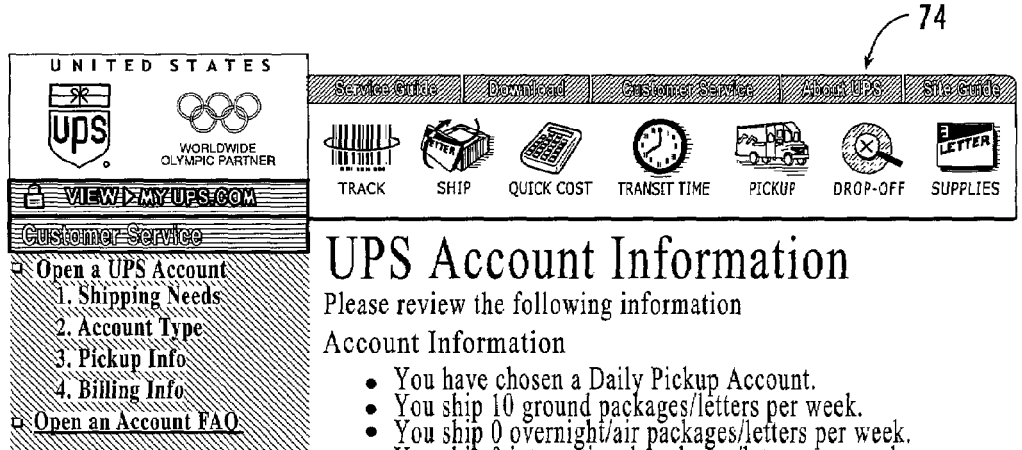

FIG. 16.

UPS Account Information

Please review the following information

Account Information
- You have chosen a Daily Pickup Account.
- You ship 10 ground packages/letters per week.
- You ship 0 overnight/air packages/letters per week.
- You ship 0 international packages/letters per week.
- This account is for personal use.
- You do not ship hazardous materials.

[Edit Info]

Pickup Information
- Pickup Point: Front Door
- Pickup Start Date: 3 business days from today
- Daily Closing Time: 2:00 pm
- Company Name: UPS
- Contact Name:
- Contact Title:
- Street Address:
- Rm.,Fl.,Apt.,Ste.:
- City: Roswell
- State: Goergia
- Postal Code: 30075
- Country: United States
- E-mail Address:
- Location Ohone Number:

[Edit Info]

Billing Information
- Company Name: UPS
- Contact Name:
- Contact Title:
- Street Address:
- Rm.,Fl.,Apt.,Ste.:
- P.O. Box Number:
- City: Roswell
- State: Goergia
- Postal Code: 30075
- Country: United States
- E-mail Address:
- Location Ohone Number:

[Edit Info]

If the above information is correct, please check below to submit your application.

[Submit]

Home | Track | Ship | Quick Cost | Transit Time | Pickup | Drop-off |
Supplies | Service Guide | Download | Customer Service | About UPS |
Site Guide | MY UPS.COM

FIG. 17.

Thank You

Your UPS Account Number is TT7086.

Your Account will be active on the date your pickup begins: Tuesday, April 17, 2001.

- You will recieve a New Account Start Kit within two business days.
- If you'd like to ship immediately using a credit card, please visit UPS Internet Shipping.

If you have specific questions related to using your UPS Account Number, see the UPS Service Guide or call 1-800-PICK-UPS.

Please print this page for your records or click the Printer Friendly View button below.

Printer Friendly View

Home | Track | Ship | Quick Cost | Transit Time | Pickup | Drop-off | Supplies | Service Guide | Download | Customer Service | About UPS | Site Guide | MY UPS.COM Copyright 1994-2001 United States Parcel Service of America, Inc. All Rights Reserved. 36 USC 380. Trademark and Tariff Information

ACCOUNT OPENING FACILITATION SYSTEM, METHOD AND COMPUTER PROGRAM PRODUCT

CROSS-REFERENCE TO RELATED APPLICATIONS

The present application claims priority from U.S. Provisional Application No. 60/287,845 entitled "Account Opening System and Method" and filed on May 1, 2001, the contents of which are incorporated herein by reference.

FIELD OF THE INVENTION

The present invention relates to the automation of processes for the opening of various types of accounts and, more particularly, to the use of networks and computerized systems to collect and route customer information so as to facilitate activation of the accounts, and the provision of other associated services, by a collection of backend systems.

BACKGROUND OF THE INVENTION

Many companies are faced with a need for the accelerated opening of various customer accounts in increasing numbers. Existing systems for opening of these accounts often require significant human intervention that slows the account opening process and introduces the possibility of human error, such as when customer information is related telephonically and is improperly transcribed into a database. In addition, each account must frequently be tailored to the needs of an individual customer, thus requiring multiple decisions by the customer and the accurate collection and routing of large volumes of information related to those decisions. For instance, the shipping or freight business requires the accurate and fast collection of customer information in order to open various shipping accounts.

The shipping needs of businesses and individuals vary greatly, from only the occasional shipping of packages to the shipping of multiple packages on a daily basis. More frequent shippers wish to avoid the inconvenience of paying shipping charges for each package as the package is shipped. In addition, shipping service providers benefit by making it as easy as possible for a customer to ship a package and pay for the shipment. Typically, shipping is facilitated by establishing a shipping account to which the customer can charge various shipping services and pay off the account at regular, such as monthly, intervals. A shipping account allows the customer's employee commissioning the shipping services to simply reference the account number on the packing slip, saving the employee considerable time and effort.

Some customers who ship packages have entered into an agreement with the shipping service provider where the shipping service provider dispatches a service person to pick up the packages at a prearranged time on a daily basis. The shipping service provider usually charges a fee for such services. The fee charged for pickup is typically nominal for those customers with heavy shipping needs. Those customers who ship packages on a more inconsistent basis may find that pick up service is not cost-effective and therefore choose to drop packages off at sites designated by the shipping service provider. Regardless, one of the more convenient methods of billing for the shipping service provider and the customer is to accrue charges to the charge account granted to the customer by the shipping service provider.

In order for the customer to obtain a shipping account, the customer must submit a request to open an account ("open account request") to the shipping service provider. A conventional method for opening accounts and distributing account numbers to customers is to employ a cadre of customer service representatives answering telephones, as shown in FIG. 18. When the potential customer wishes to become an account holder, the customer makes a verbal request by calling a general customer service line. The customer is referred to a customer service representative responsible for new accounts. The customer service representative conducts a telephone interview with the customer, asking a series of questions to determine the type of account desired by the customer. The customer service representative keys the information into a form. The form is then manually fed or re-keyed several times into a group of different backend systems. An account repository system assigns and activates accounts in batches by an effective date that is selected and entered by the customer service representative. Once the account has been opened, the new account number is manually recorded by the customer service representative. The customer service representative then orders a startup kit by entering the customer information into an entirely different supply system. Finally, the service representative enters a service dispatch system to schedule account services for accounts that include a daily pickup service at the customer's location.

The process for opening accounts described above is manually intensive, time consuming and has several other drawbacks. New account numbers require two or three business days to be relayed to the customer via the arrival of the startup kit or a follow-up call from the customer service representative. At best, if the customer expresses an urgent need for the account, the customer service representative can place a return call within a few hours to relay the new account number. The backend systems are many times not available due to scheduled and unscheduled downtime for maintenance or other reasons. During downtime, account numbers cannot be assigned, accounts cannot be opened and other services cannot be provided. In addition, the customer service representative may neglect completion of a form or forms, resulting in a delay, or even failure, of the account opening process. The need to reenter data into multiple forms increases the chance for transcription errors.

The telephonic relay of information from customer to service representative also has several problems. There is no way to classify the call as a "priority call" and a potential new customer could be placed on hold for several minutes. Errors may be entered into the backend systems by the customer service representative who incorrectly records information. The assignment of account-type and effective date may vary between representatives. In addition, telephone service centers are typically too costly to operate on a 24 hours per day, 7 days per week schedule.

The advent of the Internet has simplified account applications for some businesses, including the shipping industry. Accounts are requested over the shipping company's world wide web site by filling out a variety of forms with various customer information. The forms are then processed by the shipping service provider, an account is opened and the customer is contacted with an account number. The delay between the account application and the issuance of an account number can be irritating to the customer and may result in a loss of business with that customer. One shipping service provider (Federal Express®) addresses this problem by providing an account number for each different type of account and in real time, in response to applications submitted over the Internet.

Regardless of the manner in which the account application is submitted, the systems that are employed to generate the account number and establish the account sometimes fail to issue an account number due to downtime of one or more systems. Downtime is typically encountered when one of the systems for processing the account application is undergoing maintenance or has experienced a system failure. During this downtime, an account number is not available in conventional telephonic application systems or Internet application systems. A customer, frustrated by slow service, may be lost during this period.

It would be advantageous to have an Internet accessible system for the collection and processing of account applications without the need for a large number of customer service representatives to communicate with the customer and to manually enter customer information. It would also be advantageous if account numbers could be issued to the customer on a real time basis despite scheduled and unscheduled downtime of various account processing systems.

SUMMARY OF THE INVENTION

The present invention addresses the above needs and achieves other advantages by providing a system for facilitating the opening of accounts by one or more backend systems. The account opening facilitation system includes a front-end interface that interacts with a customer to collect customer information such as an account-type selection, billing information and pickup location information. The account opening facilitation system also includes a backend interface that pre-validates the customer information and routes the customer information to the backend systems for activation of the account. The backend interface also includes a monitoring system ("monitor") that determines the availability of the backend systems and a cache that stores the open account request and customer information for later routing when the backend systems are temporarily unavailable. Advantageously, pre-validation of the customer information allows the backend interface to distribute an account number to the customer in real time when the backend systems are unavailable. Pre-validation ensures that the customer information is sufficiently correct to allow later activation of the account by the backend systems.

In one embodiment, the account opening facilitation system ("account opening system") includes a customer information validator that receives the customer information from the customer query interface and validates the customer information. The account opening system also includes a messaging or routing system operable to format, dispatch and receive messages to and from each of the backend systems. The messaging system can format and dispatch the open account request to an account repository system of the backend systems in response to validation of the customer information. If the backend systems are not available, the account opening system also includes a cache for storing the messages until the backend systems are available. Advantageously, storage of the messages in the cache allows open account requests to be submitted by the customer even when the backend systems are unavailable due to scheduled or unscheduled downtime.

The account may be a shipping account for the shipment of packages through a shipping service provider, or some other type of consumer or business account. Different types of shipping accounts include an occasional shipping account and a periodic (typically daily) shipping account. In one aspect, the occasional shipping account is useable by the customer the moment the account number has been generated by the account repository system. In another aspect, the daily shipping account is not useable by the customer until a predetermined delay has elapsed during which time the periodic pickup visits are being scheduled. The delay may also be used when one of the backend systems is unavailable and the account request cannot be fulfilled. The account opening system can include a monitor that determines whether the backend systems are available by either checking a downtime schedule for each of the backend systems, or using a query or "ping" logic that determines the responsiveness of the backend systems.

In one aspect, the monitor can send a query message through the messaging system to one or more of the backend systems. The query message can be a simple query sent to the backend system. Failure of the backend system to reply may indicate that the backend system in unavailable, or the backend system may send a reply indicating that it is unavailable. The message can also contain information formatted to reach several subsystems of the backend system, allowing the monitor to determine if the backend system is completely or partially available. For instance, a query message could be sent by the monitor that is formatted by the messaging system and sent to the account repository system. The query message contains information formatted to reach an account number database of the account repository system, allowing the account repository system or the monitor system to determine if the account number database is available. Another query warns when the database has fewer account numbers than a predefined minimum number of account numbers. The query message can also include warning information that indicates to the backend system, and its subsystems, that the query message is a test and not a typical message requiring complete processing and a response. The warning information advantageously prevents the backend systems from sending false information to the account opening system.

In another aspect, the customer information includes shipping and billing address information. The account repository system includes an address validator that validates the shipping and billing address information before opening the account. The customer information validator pre-validates the same shipping and billing address information, allowing the open account request to be stored in the cache for later execution without a risk of rejection by the address validator of the account repository system. The pre-validation is performed in real time while the customer is still in the application, allowing the customer to correct any inaccuracies. Preferably the validator pre-validates city, state and zip code and more preferably the validator performs an additional street-level validation.

The present invention is useful with a variety of backend systems, but the particular structure of the one or more backend systems is not a part of the present invention. The backend systems are typically separate systems that require the messaging system to customize message formatting and language conventions before participating in the open account request. In addition to the account repository system, the backend systems can include a supply system that sends supplies to the customer. For example, if the account opening system is opening a shipping account, the supplies may include a supply kit that contains various instructions and materials facilitating use of the shipping account by the customer. The backend systems can also include a service system for distributing services to the customer. For example, in the case of a daily shipping account, the service system can comprise a scheduling system and a service dispatch system. The scheduling system can perform a service schedule verification with the customer. The service schedule verification ensures that shipping services are provided at appropriate times to the customer. The service dispatch system then dispatches shipping service personnel to the customer's location for daily pickup of packages.

In another aspect, the present invention comprises a system and method for opening customer shipping accounts over the Internet that acquires customer information, recommends a type of shipping account based on the customer information and pre-validates selected customer information to allow the immediate distribution of an account number to the customer that is useable for both ground shipping, air shipping and international shipping orders.

A front-end interface is used to communicate over the Internet with the customer to obtain and validate customer information and to distribute shipping account numbers in real time to the customer without requiring the involvement of a customer service representative. A backend interface is used to send open account messages to one or more separate back-end systems to open customer accounts corresponding to the account numbers. The backend interface communicates with the customer over the front-end interface and establishes the shipping account if the backend systems are available, or stores the open account messages in a cache for later delivery if the backend systems are not available.

In another embodiment, the present invention includes a graphical user interface for communicating with a customer over the Internet and for communicating with one or more backend systems to establish a shipping account with a shipping service provider. The graphical user interface includes a customer information query that records customer information submitted by the customer. The customer information preferably includes ground shipping needs information on the customer's projected future ground shipment needs and air shipping needs information on the customer's projected future air shipment needs. An account recommendation interface of the graphical user interface recommends a type of account to the customer based on the ground shipping needs information and air shipping needs information submitted by the customer. The account recommendation interface also includes an account selection field allowing the customer to select the type of account desired by the customer if different from the recommended type of account. The account recommendation interface communicates an account opening request to the backend systems to open the type of account selected by the customer. The graphical user interface also includes an account number interface that communicates to the customer an account number corresponding to the newly established shipping account for placement of both ground and air shipping orders. The account number interface can be configured to communicate the account number to the customer in real time and to communicate to the customer a delay which must elapse before shipping orders can be placed using the account number. The delay is based on the availability of the backend systems that receive and execute the opening request.

In one aspect, the account recommendation interface calculates the cost of the ground shipment needs and the air shipment needs to determine a most cost-effective account to recommend to the customer. The most cost-effective account for shipment can alternatively be a daily pickup account in which the shipping service provider makes a daily stop at the customer's shipping location, or an occasional pickup account in which the shipping service provider does not make a daily stop at the customer's shipping location. The account opening system can also recommend a credit card shipping account if the shipping volume is so low that an occasional account is not effective.

The present invention may also be used by a telephone service center. A service person of the telephone service center accepts an open account request from a customer over the telephone and submits the open account request. In this case, the service person enters information communicated by the customer into the account opening system and obtains the account number for the customer.

In another aspect, the front-end interface of the account opening system includes modular, scalable architecture comprising several components which interact to present a series of web pages to obtain customer information from the customer. The front-end interface is broken down into page objects which contain information on how to display the page, as well as handler objects which contain the logic required to process that page.

The account opening system of the present invention has several advantages over the prior art. From the customer's perspective, the account opening system is convenient and easy to use because it is accessible by the Internet. Also, the account opening system immediately provides an account number with minimal delay time, or no delay time, before the account can be used. The account opening system advantageously automatically requests supply materials, including startup kits, for the customer and services for the customer that are associated with the account. In the case of shipping accounts, the customer is provided with a single account number that can be used for both ground and air shipments. The account number is immediately available for shipments for some type of accounts, and if not immediately available, the customer knows when the account will be available for shipments. In addition, no credit card is required to use the account.

The account opening system also has advantages for the account provider. The account opening system avoids the expense of personnel dedicated to entering data and coordinating the use of the backend systems. Data entry errors are avoided as the customer inputs their own data into the graphical user interface. In the case of a telephone center, the account opening system coordinates the use of the backend systems, minimizing errors and delays in the opening of accounts. Account numbers may still be granted even when backend systems are down, limiting the loss of customers during a scheduled, or unscheduled, interruption of the availability of the backend systems. The above-listed advantages of the account opening system are likely to attract additional customers beyond those willing to use conventional systems thereby increasing the number of account subscriptions.

BRIEF DESCRIPTION OF THE DRAWINGS

Figure 1:
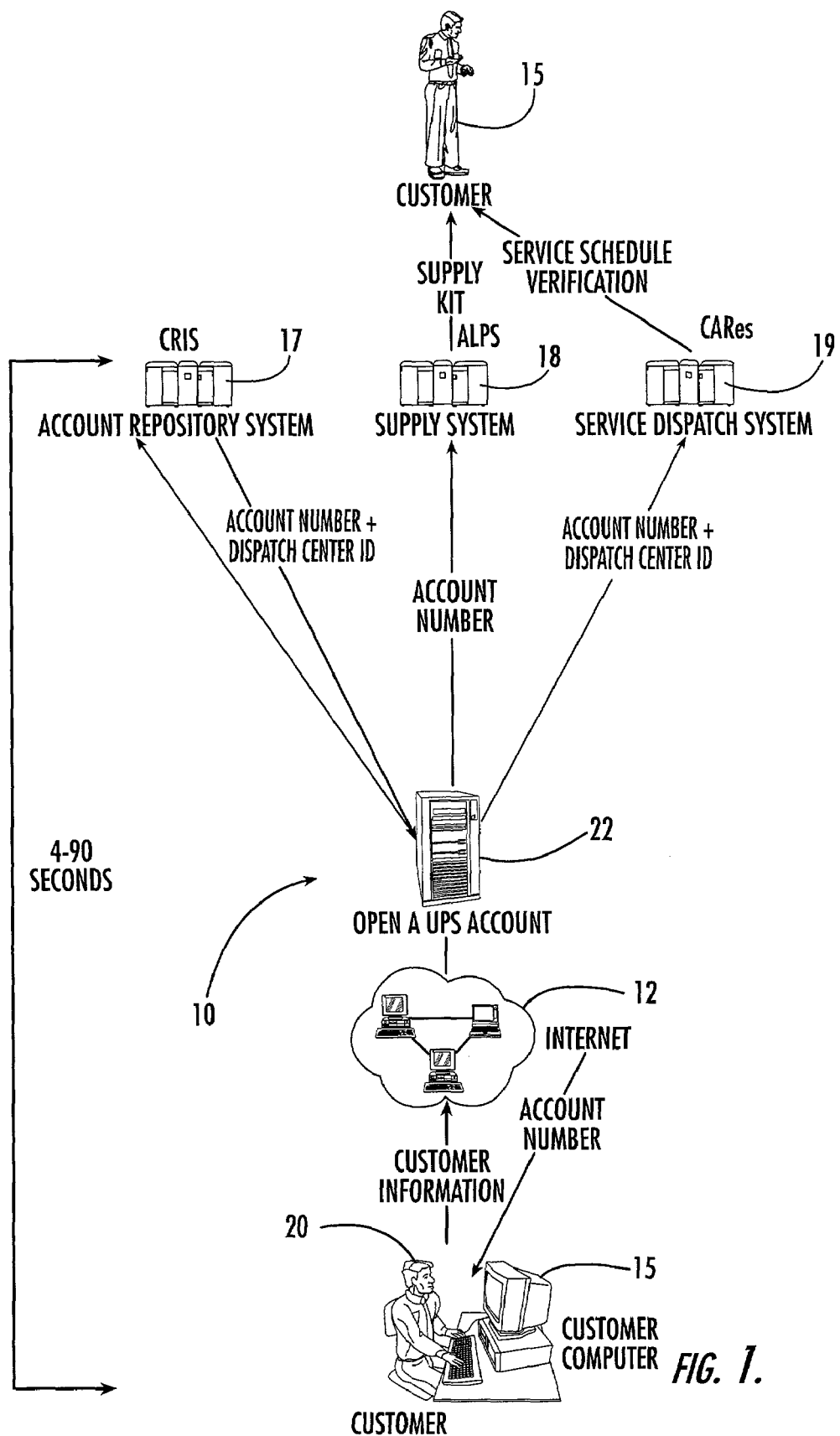
Figure 2:
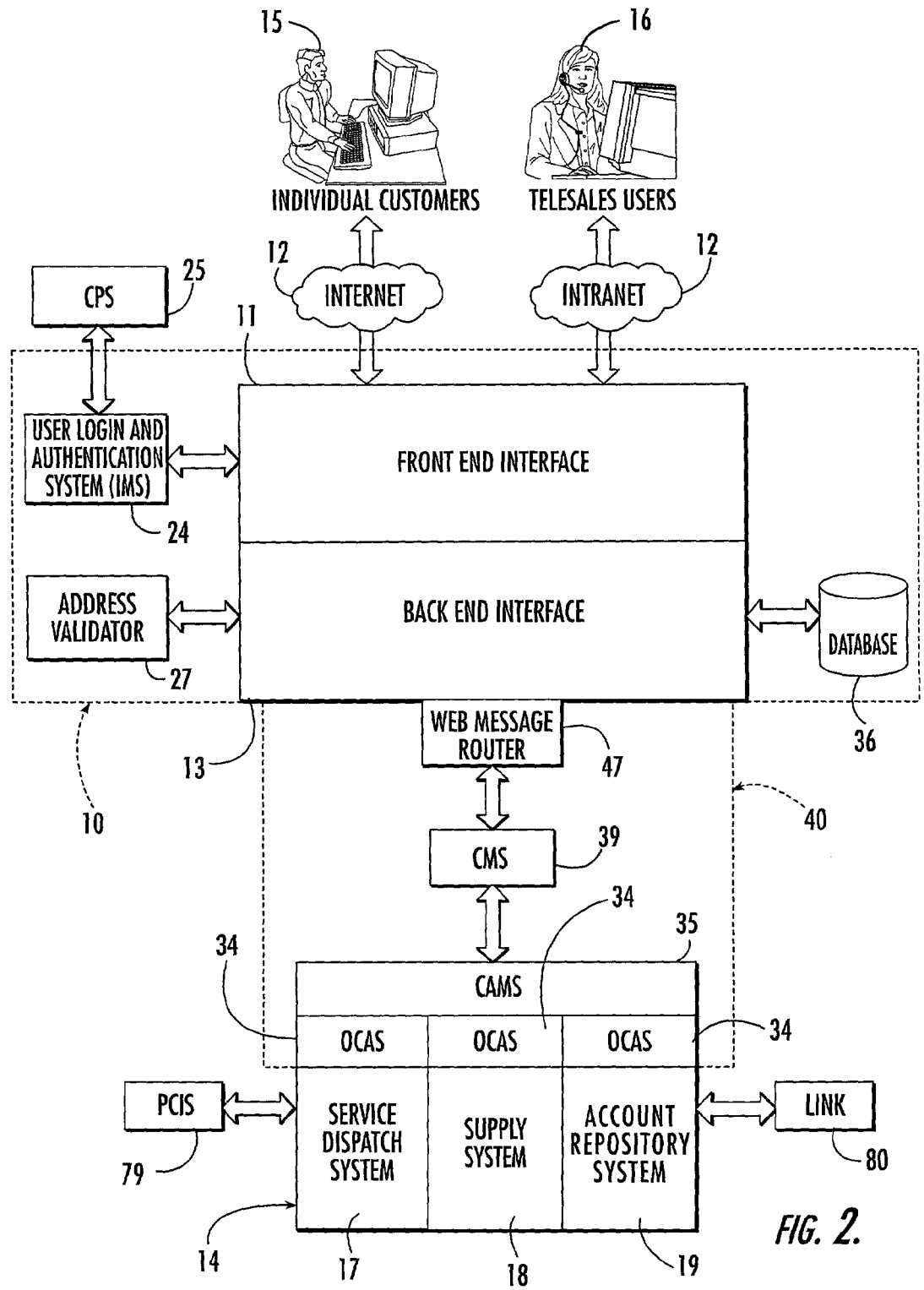
Figure 3:
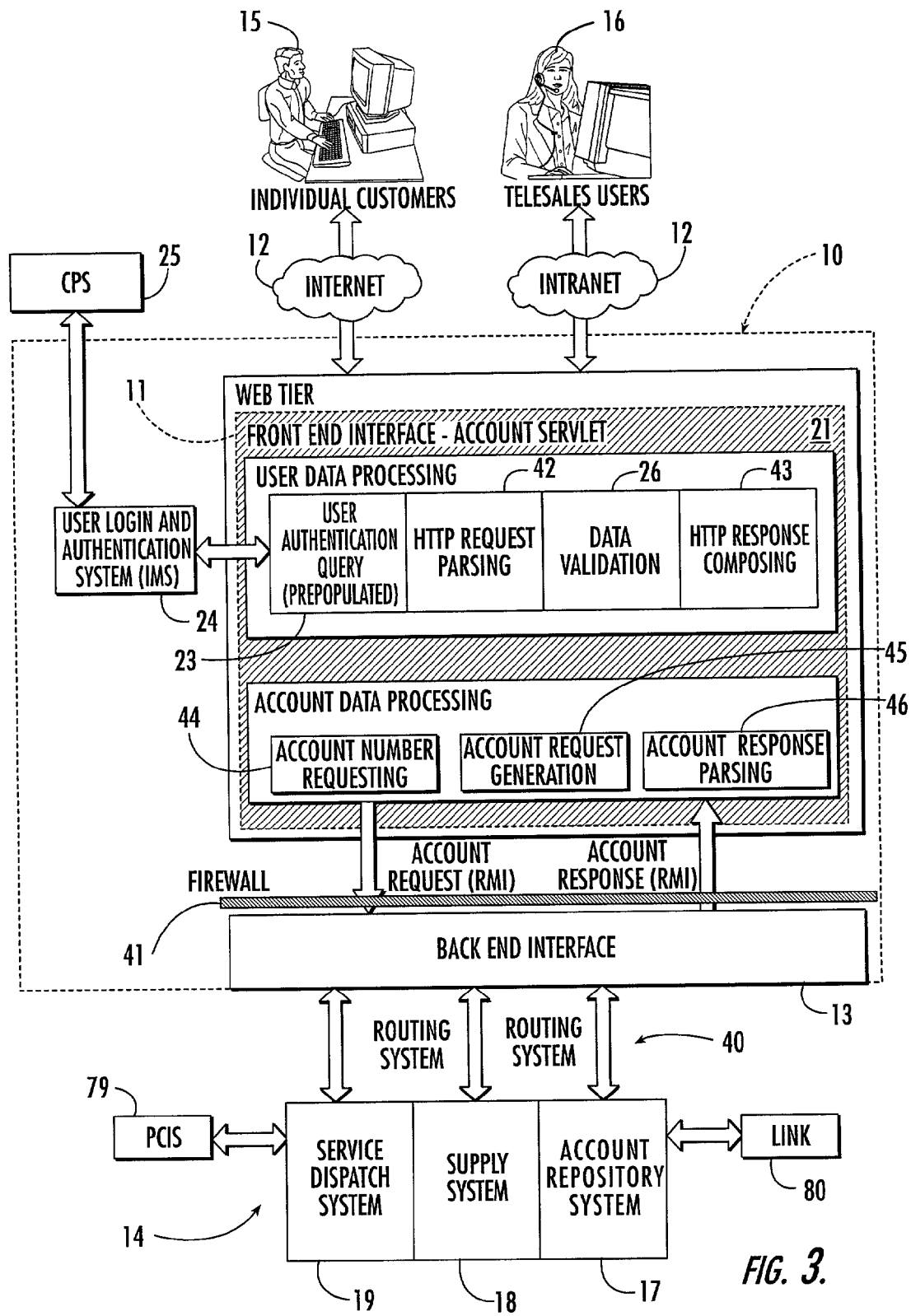
Figure 4:
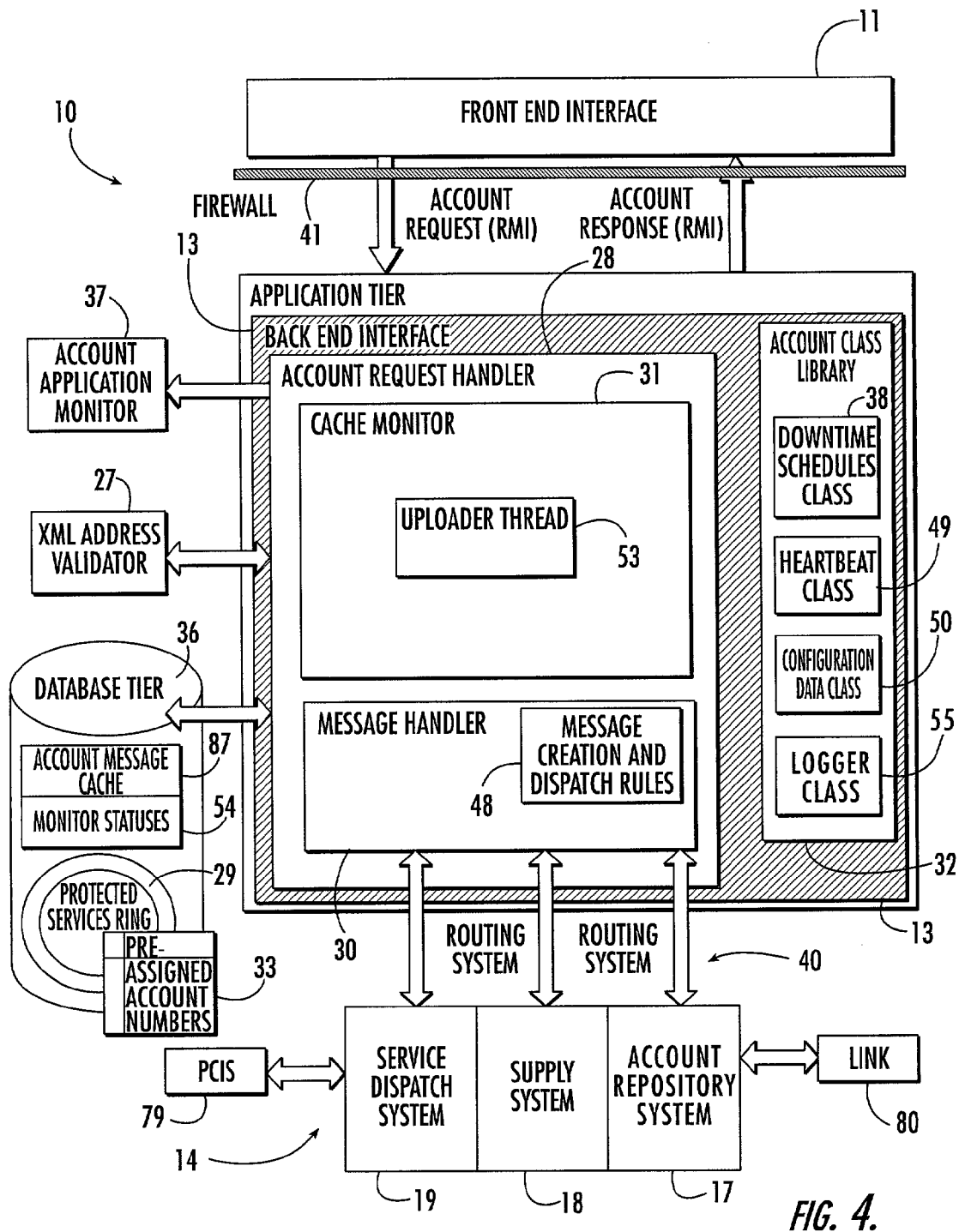
Figure 5:
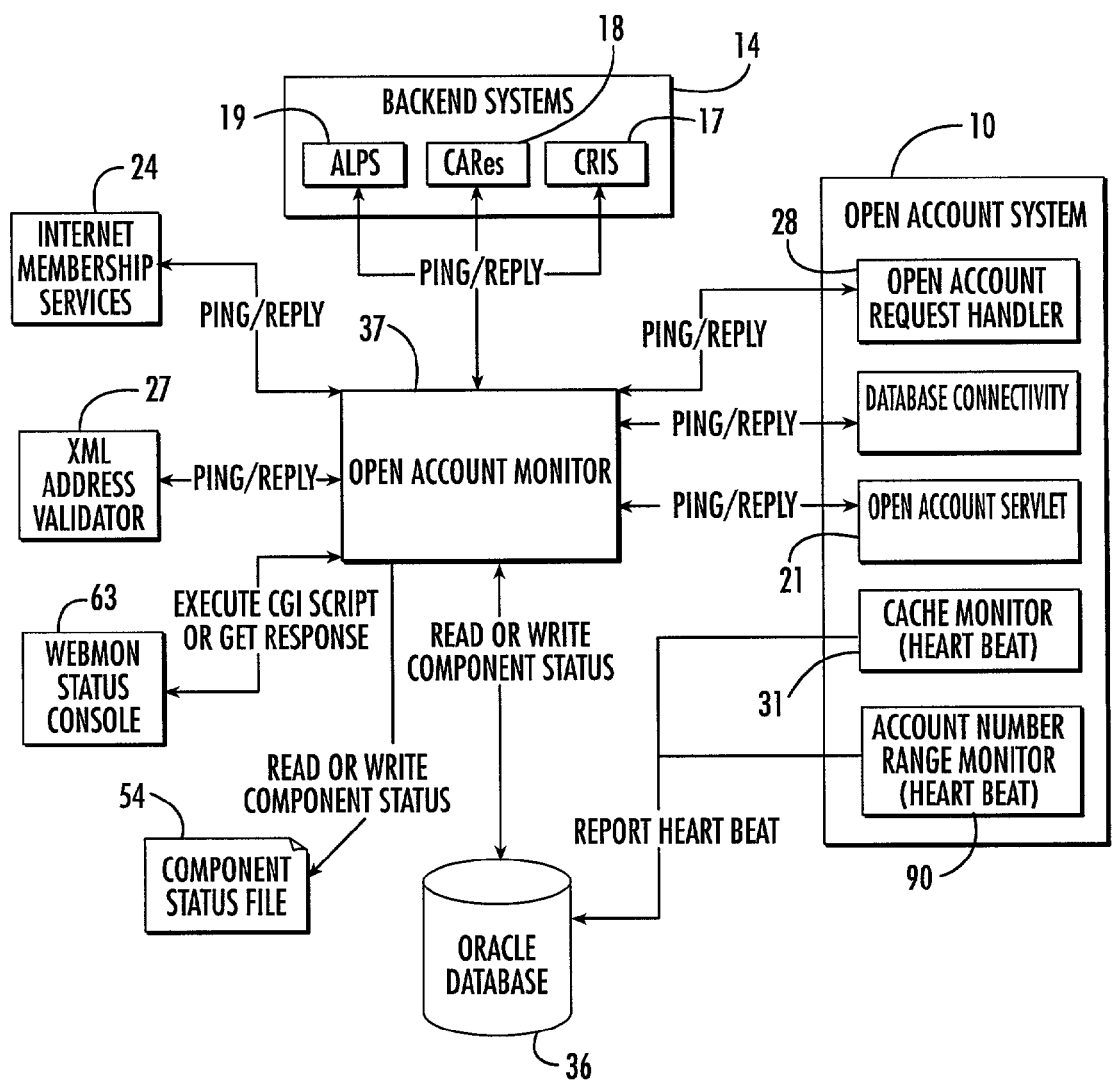
Figure 6:
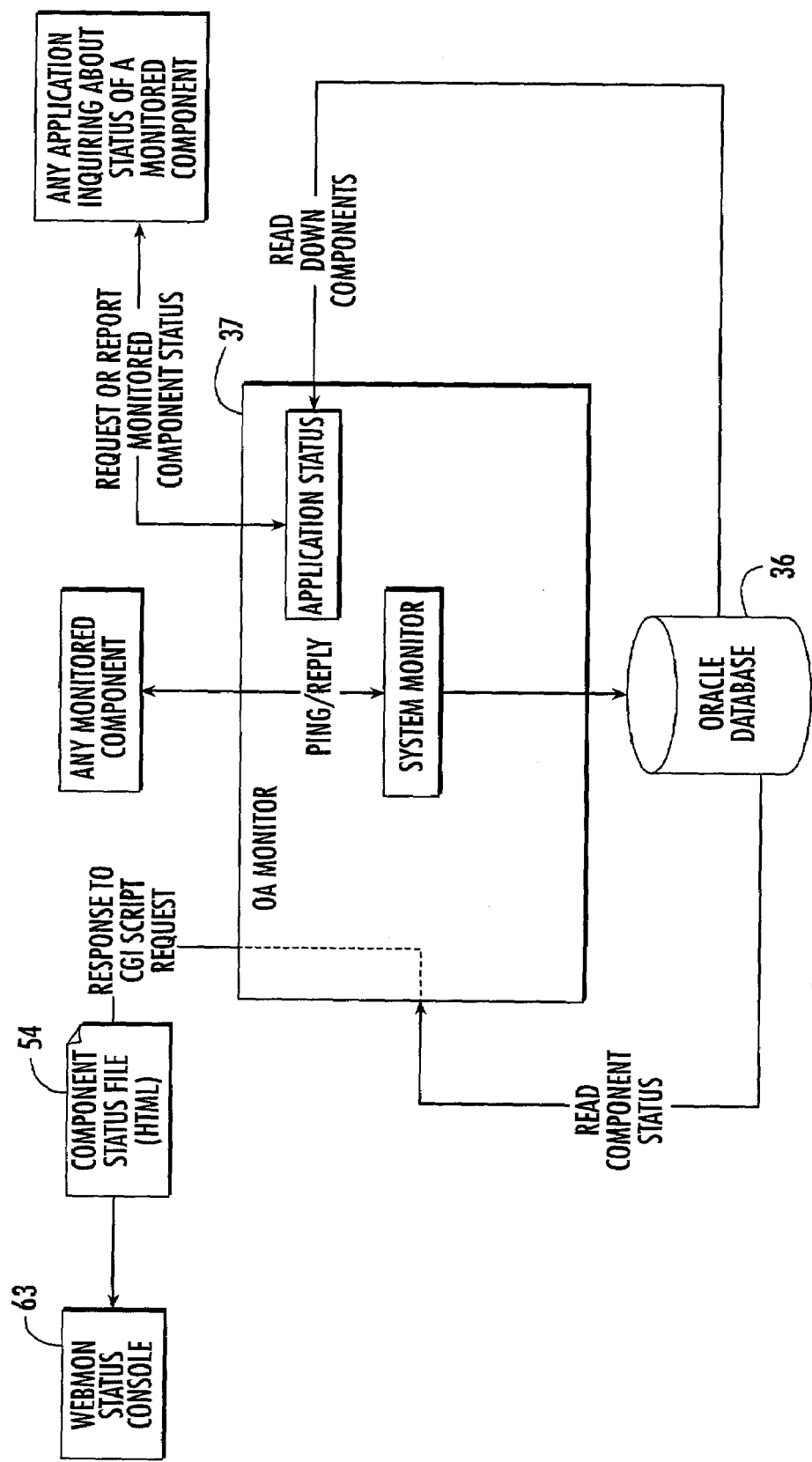

Having thus described the invention in general terms, reference will now be made to the accompanying drawings, which are not necessarily drawn to scale, and wherein:

FIG. 1 is a schematic diagram of an account opening system of one embodiment of the present invention showing the relationship between the account opening system, a customer computer and a plurality of backend systems;

FIG. 2 is a block diagram of the account opening system of FIG. 1 interacting with the plurality of backend systems;

FIG. 3 is a block diagram of a front-end interface of the account opening system of FIG. 2;

FIG. 4 is a block diagram of a backend interface of the account opening system of FIG. 2;

FIG. 5 is a block diagram of an open account monitor of the account opening system of FIG. 2;

FIG. 6 is another block diagram of the account opening system monitor of FIG. 5

Figure 7A:
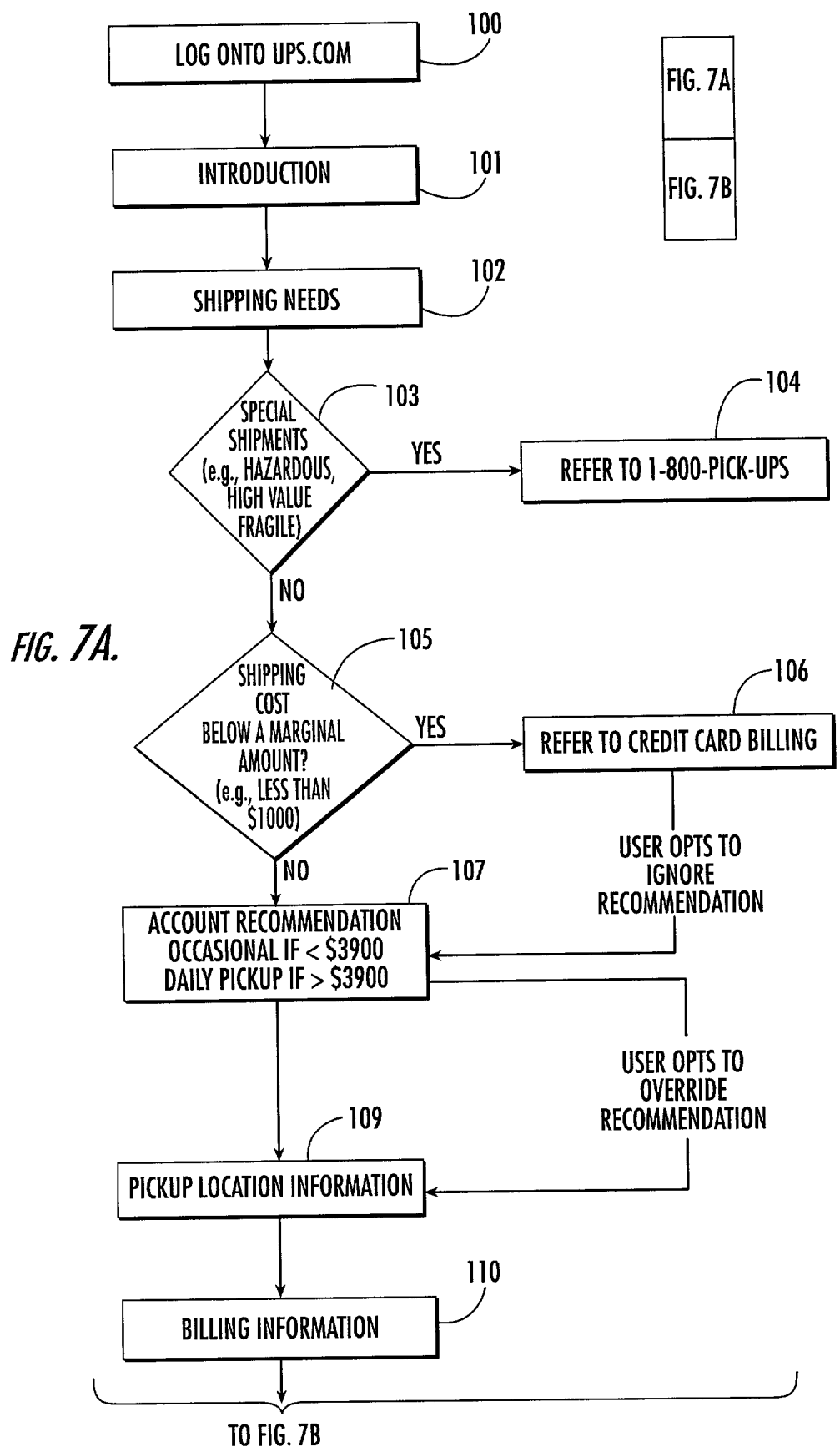
Figure 18:
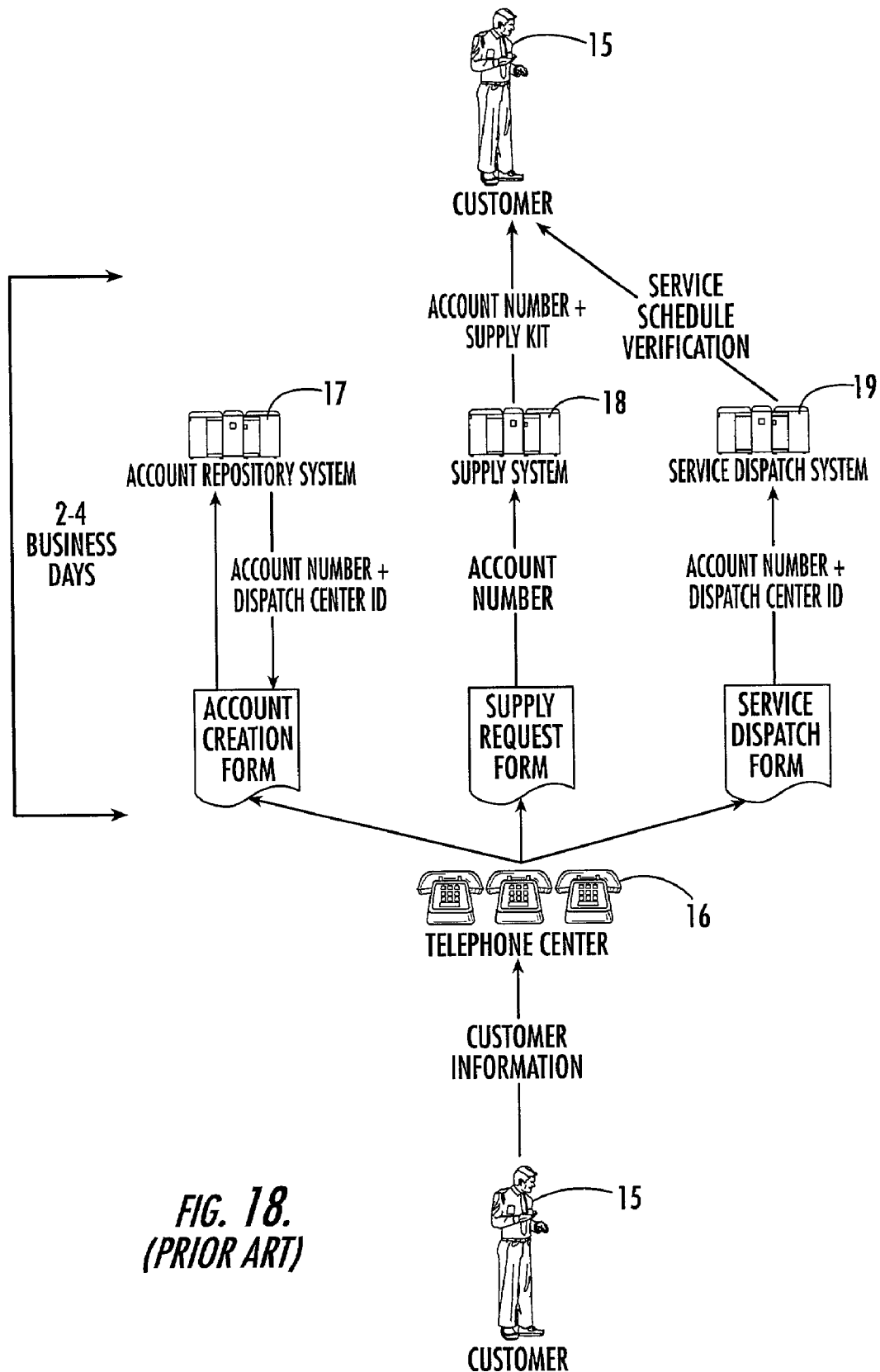

FIGS. 7A and 7B are flowcharts of an account opening method executed by a computer program product of another embodiment of the present invention;

FIG. 8 is a screen shot of a start page of a graphical user interface of another embodiment of the present invention;

FIG. 9 is a screen shot of a shipping needs page of the graphical user interface;

FIG. 10 is a screen shot of contact page of the graphical user interface;

FIG. 11 is a screen shot of a credit card shipping page of the graphical user interface;

FIG. 12 is a screen shot of an account-type page of the graphical user interface;

FIG. 13 is a screen shot of a service charge page of the graphical user interface;

FIG. 14 is a screen shot of a pickup information page of the graphical user interface;

FIG. 15 is a screen shot of a billing information page of the graphical user interface;

FIG. 16 is a screen shot of an account information page of the graphical user interface;

FIG. 17 is a screen shot of an account number provision page of the graphical user interface of the present invention; and FIG. 18 is a schematic diagram of a prior art system for opening accounts.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

One embodiment of a system for facilitating opening of accounts, or "account opening system" 10 of the present invention is shown in FIGS. 1-6. The account opening system 10 includes a front-end interface 11 that is accessible by a customer 15 or a service center 16 over a network 12, such as the public Internet, private intranet or local area network, and a backend interface 13 that communicates by sending messages through a routing system 40 to a plurality of backend systems 14, as shown in FIG. 2.

The front-end interface 11 of the account opening system 10 collects customer information from a customer 15 sent via a customer computer 20 over the network 12, as shown in FIG. 1. The front-end interface 11 of the account opening system 10 recommends an account-type based on the customer information and solicits an account preference from the customer. The account opening system communicates the account preference through the backend interface 13 to an account repository system 17 ("ARS") of the backend systems 14. If the account repository system is available, it verifies the validity of the customer information, generates an account number in real time (e.g., 4-90 seconds, or more preferably, 4-30 seconds) and activates an account corresponding to the account number.

If the account repository system is unavailable, the account opening system 10 pre-validates the customer information and generates an account number in real time, communicates the account number to the customer 15 using the front-end interface 11 and stores the account open request (and other messages) for forwarding to the backend systems 14 at a later time. In this manner, the customer 15 receives an account number even if one, some or all of the backend systems 14 are unavailable or become unavailable. Also, pre-validation of the customer information by the account opening system 10 ensures that the customer information will be found valid by the account repository system 17 when the account repository system receives the held and forwarded messages.

Optionally, the account opening system 10 can communicate with other types of backend systems 14 that can perform a range of functions. For instance, the backend systems could also include a supply system 18 ("SS") that receives the customer information and account number from the account opening system and sends supplies to the customer 15, such as a startup kit. The startup kit contains instructions and materials to be used with the newly opened account. In another aspect, the backend systems 14 also include a service dispatch system 19 ("SDS") for supplying services to the customer 15 after receiving the account number and customer information from the account opening system. One example of a startup kit would be a kit for the startup of a shipping account that includes envelopes, labels detailed shipping instructions, and rate tables. An example of services supplied by the service system 19 would be scheduling of a daily pickup for packages shipped using a shipping account. The service system 19 communicates through a package center information system 79, or PCIS, with package centers to setup the schedule times. The account repository system 17 communicates customer information and account information to sales force automation software 80, referred to as SFA or LINK, which is a sales force automation software package that is used by account executives of the shipping service provider to manage sales leads.

Referring to FIG. 2, the front-end interface 11 of the account opening system resides on a "web tier" because it comprises a Java account servlet 21 that generates a plurality of web pages that appear on the customer computer 20. The account servlet operates on a server 22 or servers and is separated from the backend interface 13 by a firewall 41 for security purposes, as shown in both FIGS. 3 and 4. In this manner, the account opening system 10 interacts with the customer 15 through a graphical user interface to obtain customer information from the customer and relay open account information to the customer, as generally shown by the screen shots of web pages in FIGS. 8-17. The servlet 21 is not restricted to running on the server 22, but could also be run on other types of hardware, firmware or a combination thereof. Typically, the servlet 21 is one of many applications contained within a parent Internet site (not shown) that interacts with the customer 15 and performs other tasks in addition to opening accounts, such as advertising or sales.

The front-end interface collects information from the customer, recommends an account-type based on the customer information and submits data through the firewall to the back-end interface 13 for additional processing. These front-end interface functions are performed by a group of customer (or user) data processing systems and a group of account data processing systems, as shown in FIG. 3. The user data processing systems include a user authentication query 23, an HTTP request parsing system 42, an HTTP response composing system 43 and a data validation system 26.

The user authentication query 23 communicates with a user login and authentication system 24 (a.k.a., internet membership services (IMS)) of the parent Internet site and a customer profile system 25. The authentication system 24 controls the logon and other associated access rights of the parent Internet site. The customer profile system (CPS) 25 stores information on the customer that is obtained and used by the parent Internet site, as shown in FIG. 2. The customer is asked to log onto the Internet site through the authentication system 24 before submitting an open account request. Any relevant customer information that is supplied during logon is stored in the CPS 25 and used to prepopulate the web pages of the front-end interface 11. Communications between the account opening system 10 and the customer can also occur through a secure socket layer (SSL) which is a secure web browser that can protect sensitive personal information sent by the customer over the Internet.

After a new account is successfully opened, the account opening system 10 can update the user login and authentication system 24 by sending it the newly issued account number. In turn, the user login and authentication system updates the customer profile system 25, storing the account number for future use with the other profile information. The account number can then be accessed and used, along with the remaining profile information, by the parent Internet site and its other systems. For instance, the other systems can prepopulate various information fields with the account number when interacting with the user, eliminating the need to reenter the account number in each application.

The HTTP request parsing system 42 parses all customer-submitted and application specific information into a useable, internal data representation. Conversely, the HTTP response composing system 43 applies business rules to internal data to generate an HTML page that is recognizable by various Internet browsers. The data validation system 26 uses business rules to check the validity of customer information submitted on the fields of the web pages and refuses to accept erroneous data submitted by the customer, such as the use of incorrect characters in various fields.

The account data processing systems include an account number requesting system 44, an account request generation system 45 and an account response parsing system 46. The account number requesting system uses remote method invocation (RMI) calls to the backend interface 13 and obtains the next available account number from a pool or table 33 of available account numbers stored in a protected services ring 29. The account request generation system 45 also uses RMI to send customer information to the backend interface for further processing and transmission to the backend systems 14. The account response parsing system 46 reviews and updates completed messages to and from the backend interface 13. Although RMI is preferred, a number of other methods for sending messages are known in the art and could be used.

In another aspect, the front-end interface 11 includes modular, scalable architecture comprising several components which interact to present a series of web pages to obtain customer information from the customer. The open account front-end interface is broken down into page objects which contain information on how to display the page, as well as handler objects which contain the logic required to process that page.

Preferably, the web pages are described using an XML file. The XML file defines the input objects which are included on each page. The input objects include input fields for collecting and displaying information. In one example, the input page collects pickup information for the delivery of a package and the input objects such as location information, contact information and address information. The input object having address information may be comprised of several input fields such as city, state, zip code and street number.

Every input page of the account opening system 10 has a pointer to a page handler that is instantiated by a page factory when the input page is created. The page handler contains business logic and functionality for processing input from a page using a validation method or a setup method. If a page handler exists with the functionality that is needed for a new page, the existing handler can be reused and does not have to be rewritten. A validator of the page handler validates the input into the input field and reports a failure for invalid information. The input page and page handler allow the modification of preexisting web pages and the creation of new web pages simply through the creation or modification of an XML file. In this manner, the web pages may be adapted for use in several countries, each of which have different business rules. Advantageously, the front-end interface 11 is easily updated and maintained. Changes to one business logic component do not affect all components of the front-end interface and updates of the interface do not require a restart of the server 22.

The backend interface 13 of the account opening system 10 obtains account numbers from the protected services ring 29, as shown in FIG. 4. The protected services ring contains a pre-assigned account number table 33 from which the backend interface 13 can assign an account number to the customer. The pre-assigned range of account numbers in the database are unique, ensuring that duplicate numbers are not assigned by the account repository system 17 because the account repository system will not assign numbers in the pre-assigned range. The pre-assigned account number table 33 resides in the protected services ring 29 24 hours per day, 7 days per week. Batches of account numbers are preferably obtained from the account repository system 17 for storage and distribution by the account opening system 10 on a periodic basis, such as twice per year.

The backend interface 13 resides on an application tier that interacts with the front-end interface 11 through the firewall 41, as shown in FIGS. 3 and 4. The backend interface prepares account information for transmittal to the backend systems 14 and handles store and forward (caching) functionality when one of the backend systems is unavailable. The backend interface includes an account request handler 28 for handling account requests by receiving RMI messages from the servlet 21 and dispatching the messages to other systems.

The account request handler 28 includes a message handler 30, a cache monitor 31 and a web message router 47. The message handler 30 receives requests from the account request handler 28 and formats appropriate mainframe messages to the backend systems 14. Restated, the message handler 30 translates the requests for appropriate backend systems 14. Translation renders the messages readable by the separate backend systems which may have been developed independently and therefore have different message formatting and usage conventions from each other, and from the account opening system.

The message handler 30 passes messages to the web message router 47 which is part of the routing system 40, as shown in FIG. 1. The web message router 47 receives messages transmitted from the message handler 30 and transmits the messages to the rest of the routing system 40 and awaits message responses from the rest of the routing system. The remainder of the routing system includes a customer message server (CMS) 39, a customer automation management system (CAMS) 35, and an online customer access system (OCAS) 34. The routing system 40 routes messages between the account opening system 10 and the backend systems 14. Although several routing systems are used in the preferred embodiment, the routing systems could be collapsed into a single routing system that handles all the messages between the account opening system 10 and the backend systems 14.

In addition, the routing system 40 could be integrated, as a whole or in part, into the account opening system 10.

The message handler 30 operates within a set of message creation and dispatching rules to determine whether a message should be immediately transmitted to the backend systems 14 or sent to a database 36 that contains an account message cache 87, the account number pool 33 and a monitor status file 54. For example, the message creation and dispatching rules contain mainframe availability times, scheduled downtimes and timeout parameters from a class library 32. The class library contains message formatting rules 48 for the backend systems 14, a downtime schedule 38 for the backend systems, message logging functions, database connectivity functions, a heartbeat class 49, a configuration data class 50, and a logger class 55. The heartbeat class 49 defines a function that checks the database 36 at specified time intervals, looking for a cached message or messages that require retransmission. The configuration data class 50 contains various configurations for the account opening system 10 such as a message transmission timeout interval, a maximum number of message retries, database connection parameters, a heartbeat interval, database host names, server addresses, backend system hosts, RMI port numbers and configuration information, logging file names and system defaults. The logger class 55 is used to write application messages to a log file.

The cache monitor 31 examines the status of messages cached in the database 36. Successfully transmitted messages are removed from the database and written to a success log file 51. Messages that exceed the maximum number of retries, as per the configuration data class 50, are removed from the database 36 and written to a failure log file 52. The cache monitor 31 launches an uploader thread 53 that processes those messages that are still "in process," i.e., that have neither failed nor been successfully transmitted.

The backend interface 13 pre-validates customer address information by submitting the information to a validating system 27 before submitting the customer information to the backend systems 14. Pre-validation of the customer information ensures that cached messages are not later rejected by validation systems included in the backend systems 14. This is particularly problematic when the customer 15 has logged off of the system and can no longer correct the customer information. Preferably, pre-validation performed by the backend interface is at least as stringent as the validation performed at the backend systems 14. In the illustrated embodiment, the backend interface 13 employs an XML address validator as part of a validating system 27 to pre-validate the customer's address information such as street name, city, state and zip code combinations. Communications to and from the validating system 27 are performed via eXtensible Markup Language (XML). Optionally, the validating system 27 can also be used to validate other types of information, such as credit report data that ensures creditworthiness of the customer 15.

The backend interface 13 may also interact with, or include, an open account application monitor 37, as shown in FIGS. 5 and 6. The open account monitor 37 is used to monitor both the account opening systems and the external systems. In general, the monitor 37 indicates when there is a communication problem or unplanned outage with one of the systems. For instance, the open account monitor 37 monitors the availability of the address validator 27, the open account request handler 28, and the servlet 21. The open account monitor 37 also verifies communication with the backend systems 14 through the routing system 40 and communication with the user login and authentication system 24. Further, the cache monitor 31 is monitored to see if it is running, and the cache size on the database 36 is monitored to ensure space in the cache for stored messages. The range of account numbers available through the protected services ring 29 is verified for unused numbers by an account number range monitor 90.

Monitor status information is kept in the monitor or component status file 54 stored in the database tier 36. When one of the monitored systems (or components) is down, then the status is listed in a status field corresponding to that system or component. The open account monitor 37 may be run as a standalone monitor, or can be connected to a Webmon application 63 that is a "status board" or a console monitoring several other applications, such as tracking and internet shipping applications. Failure of a system causes an alarm which executes an application CGI script seeking a response from the Webmon application 63 that identifies and isolates the component, system or subsystem(s) that are having problems.

The status file 54 also includes a parent component name field that eliminates duplicate notification for a single failure. For example, when a system is down then parts of the same system will be listed as down and only one failure notification will be sent. This allows diagnostic and cure actions, such as a system restart, to be applied to the system and subsystems. An update field lists a timestamp of when the file was last updated. A wakeup interval field lists the sleep time in milliseconds for a heartbeat thread. A plan type field lists whether the downtime is planned, unplanned or heartbeat. A begin downtime field lists the start time of the outage. An end downtime field lists the end time of the outage. A message field lists any specific errors that occur in the system.

During monitoring, the open account monitor 37 will consult the downtime schedule 38 of the class library 32 to determine whether any of the backend systems 14 are unavailable due to a scheduled downtime for maintenance or other reasons. The monitor 37 sends a query message (sometimes referred to as "ping" logic) through the messaging system to one or more of the backend systems 14, as shown in FIG. 6. The query message can be a simple query sent to the backend system. Failure of the backend system to reply may indicate that the backend system in unavailable, or the backend system may send a reply indicating that it is unavailable. The message can also contain information formatted to reach several subsystems of the backend system 14, allowing the monitor to determine if the backend system is completely or partially available. For instance, a query message could be sent by the monitor that is formatted by the messaging system and sent to the account repository system 17. The query message contains information formatted to request an address to be validated in the account repository system, allowing the account repository system 17 or the monitor system 37 to determine if the account repository system is available. The query message can also include warning information that indicates to the backend system, and its subsystems, that the query message is a test and not a typical message requiring complete processing and a response. The warning information advantageously prevents the backend systems 14 from sending false information to the account opening system.

The account opening system 10 responds to failure or unavailability of the backend systems 14 differently for occasional accounts and daily accounts. For the occasional account a notice that the account repository system 17 is unavailable triggers a customer notice by the account opening system 10 of an estimated future time at which the account number will be useable, typically in a number of hours. In the case of a scheduled downtime, the account opening system 10 lists the downtime derived from the downtime schedule 38. In the case of an unscheduled downtime, the account opening system lists a predetermined downtime. In the case of a daily account, the need to verify a daily pickup time between the customer and pickup personnel by the service dispatch system 19 results in a delay of several days, so no downtime is calculated. The customer is contacted based on a projected start date of scheduling via a message submitted to the dispatch system 19. When the backend systems 14 are available, the information is submitted to the backend systems which activate an account corresponding to the distributed account number. Optionally, the backend systems may also determine and verify a pickup schedule for pickup accounts and distribute a startup kit to facilitate shipping using the newly opened account and account number.

In another embodiment, the present invention includes a method for opening an account, as shown by the flowchart of FIGS. 7A and 7B. The customer 15 logs onto 100 a shipping web site, such as UPS.com, and is introduced 101 to the option of opening a shipping account with the carrier or shipping service provider, as shown by FIG. 7A. An inquiry is made into the specifics of the customer's shipping needs 102, including the amount and timing of the anticipated shipments. Also, the customer is asked whether special shipments 103, such as hazardous, high value or fragile goods are going to be shipped. If special shipments are anticipated, the customer 15 is referred to an alternative service system better-equipped to deal with specialized shipping needs, such as a live agent of the shipping company at 1-800-PICK-UPS 104.

If special shipments are not anticipated, the amount and timing of the anticipated shipments are used to calculate a yearly cost of the projected shipments. The yearly cost is compared to a minimal or marginal amount 105, such as whether the yearly shipping costs are projected to be less than $1,000. If below the marginal amount, the customer is referred to a credit card billing service 106 as the suggested, more cost-effective billing method. If the customer 15 opts to ignore the recommendation, or if the projected yearly cost of shipments exceeds the minimal amount, an occasional account or a daily pickup account is recommended 107. In particular, an occasional account is suggested if the charges are below a threshold amount, such as $3,900 per year, or a daily pickup account is suggested if the projected charges are above the threshold amount. The selected marginal and threshold amounts used herein are exemplary and can be adjusted due to several factors such as price inflation, changes in shipping costs or a desire to encourage opening of different account types.

The customer 15 either accepts the recommended account type, or opts to override the account recommendation and selects a different account type. Regardless of the account type selected, information on the customer's pickup location is then collected 109 and the customer's billing information is recorded 110. The billing information, shipping type selection and any other relevant information are collated, summarized and presented for review and correction 111 by the customer 15, as shown by FIG. 7B. After review the customer information is pre-validated 112, such as by ensuring that the billing address has a correct zip code, preferably with greater stringency than the validation performed by the backend systems 14 before activating an account. If the customer information is not successfully validated, the customer is again asked to review and correct the information 111 before another attempt at pre-validation 112. If the customer information is successfully validated, an account number is assigned and presented 113 to the customer 15.

The account repository system 17 is checked for availability 114 and if not available, the account opening system 10 assigns an account number 115 to the customer and notifies the customer of a delay before the account number may be used. The delay is projected from using the downtime schedule 38, or if unscheduled, is reported as a predetermined, preferably conservative, amount of time such as eight days. Customer information and the account number, if assigned, are stored and forwarded 116 when the account repository system 17 becomes available. When the account repository system is available it assigns an account number to the customer 117 unless an account number has already been assigned by the account opening system 10. If the account is a daily pickup account, pickup services are scheduled 118 and the customer 15 is notified of a projected delay before the account is useable, which is preferably the amount of time until the first pickup date. Once the account number has been assigned, the account repository system 17 activates an account 119 corresponding to the account number and a startup kit is distributed to the customer. As discussed above, the account number can then be used to update 120 the user login and authentication system 24 which stores the account number on the customer profile system 25. The customer profile information, along with the account number, is used to pre-populate various other Internet shipping applications, such as supply ordering and packaging ordering systems.

In yet another embodiment, the present invention includes a plurality of graphical user interface panels, preferably in the form of Internet web pages, that are distributed over the network 12 by the servlet 21 of the front-end interface 11 and that appear on the customer computer 20. The term "graphical user panel" is used herein to describe any computer-generated graphical image or collection of images, such as a window, a collection of input and output fields, an entire web page or a portions of several web pages on a computer screen. The web pages allow the customer 15 to communicate with the backend systems 14 to establish a shipping account with the shipping service provider. The account opening system includes a start page 64, a shipping needs page 65, a contact page 68, an account-type page 69, a service charge page 70, a credit card shipping page 71, a pickup location information page 72, a billing information page 73, an account information page 74 and an account number provision page 75, as shown in FIGS. 8-17, respectively.

Different types of shipping accounts may be opened with the account opening system 10, including a daily pickup account (a.k.a., a regular account) wherein a service provider will call at the customer 15's premises once each business day to pick up packages without a special pickup request and whether or not any packages are available for delivery. Another type of shipping account is an occasional account (a.k.a., an on-demand account or non-regular account) in which the customer is responsible for entering the package into the shipper's delivery system by using a self-service option, such as dropping the package off at a designated drop-off location. There is no daily pickup call by the service provider with an occasional account. The front-end interface 11 recommends either the daily pickup account or the occasional account depending upon the projected shipping needs of the customer 15 and a projected account annual shipping revenue calculation. If desired, other types of shipping accounts can also be opened by the account opening system 10 of the present invention, such as an import account.

The start page 64 summarizes the steps that must be completed to open a shipping account, as shown in FIG. 8. That start page includes a start button 66 that the customer 15 selects to continue the shipping account opening process. The shipping needs web page 65 collects basic shipping information and includes shipping type and frequency fields 67, as shown in FIG. 9. The customer fills in a plurality of shipping type and frequency fields by indicating the number of ground, air and international packages or letters that that customer expects to ship per week (or month). The estimated shipping costs for the customer for a year are calculated by the front-end interface 11 using an annual revenue equation that projects the yearly shipping costs based on the amount and type of shipping services ordered on a daily, weekly, or other time interval basis. The shipping needs page 65 also includes a shipping exception selection 77 for the customer to indicate that hazardous materials and high-value, breakable goods are to be shipped, or that the customer will be acting as an authorized shipping outlet. If the customer indicates an exception, the customer is directed to the contact page 68. The contact page includes contact information (e.g., a toll-free telephone number) that allows the customer to contact the shipping service provider to provide for a more customized account to meet their shipping needs, as shown in FIG. 10.

If no shipping exception is indicated, the results of the annual revenue calculations are used to suggest a cost-effective type of account on the account-type page 69. The account-type page will list the suggested account, either a daily pickup account or an occasional pickup account, by setting the suggested account as the default selection. If the shipping charges for a year are projected to be greater than a selected amount per year, then a daily pickup account is recommended. If the total amount of shipping charges is above a minimum and below the selected amount per year, then the occasional account is recommended. For shipping costs less than the minimum amount per year, a more cost effective alternative of paying per package using a credit card is recommended by directing the user to the credit card shipping page 71, as shown in FIG. 11.

Additional information on the daily pickup and occasional shipping accounts are provided on the account-type page 69 to facilitate the customer's selection, as shown in FIG. 12. If the customer selects the daily pickup account, the customer is directed to the service charge page 70 which lists the weekly service charge for daily pickup service in proportion to the customer's weekly shipping expenditures, as shown in FIG. 13. Although specific account-types are recommended, the customer may still choose to select a non-recommended type of account.

If the user selects daily account from the account-type page 69, the pickup location information page 72 is presented, otherwise for occasional accounts the billing information page is displayed. The pickup location page includes a plurality of pickup location fields 78 that must be completed to open the daily pickup account, as shown in FIG. 14. The billing and pickup location fields may be pre-populated for the customer's convenience using information already submitted to the parent Internet site's user login and authentication system 24 or found on the customer profile system (CPS) 25. The pre-populated fields can be overwritten by the customer. Preferably, the pickup location fields request customer information on a pickup point, a pickup start date, a daily closing time, a company name, a contact name and title, an address including street address, city, state and postal code, an email address, and a location phone number. The customer is directed to the billing information page 73, as shown in FIG. 15. The billing information page must be completed for all account-types and includes a plurality of billing information fields 76. Preferably, the billing information fields request customer information on a company name, a contact name and title, an address, an email address and a company phone number. Optionally, the pickup location information page 72 may also be used to collect pickup information when an occasional account is selected.

The customer is presented with a summary of the customer information on the account information page 74, as shown in FIG. 16. The account information page allows the customer to edit the customer information, if desired, before submission of the information. Upon submission, the customer data is checked for validity using the address validator 27 and an open account request is submitted to the backend systems 14, as described above. If the backend systems, and other necessary systems, are available, then the account request is filled in real time by issuing the account number. If one, or several, of the systems are unavailable, the account request messages are cached on the database 36 for monitoring by the cache monitor 31 and later forwarding. Regardless, the account number is issued on account number provision ("Thank You Page") page 75, along with a date and/or time that the account will be active, as shown in FIG. 17. Advantageously, the account number may be used for all delivery types such as ground, air or international shipping. More specifically, daily pickup and occasional accounts allow the customer to ship ground, air and international shipments. In most cases, occasional type shipping account numbers will be available immediately.

In another aspect, the account opening system 10 is accessible by the telephone service center 16 A service person of the telephone service center accepts an open account request from the customer 15 over the telephone and submits the open account request. In this case, the service person enters information communicated by the customer into the account opening system 10 and obtains the account number for the customer in real time.

The account opening system 10 has several advantages over the prior art. From the customer's perspective, the account opening system is convenient and easy to use because it is accessible by the Internet. Also, the account opening system immediately provides an account number in real time. The account opening system advantageously automatically requests supply materials, including startup kits, for the customer and services for the customer that are associated with the account. In the case of shipping accounts, the customer is provided with a single account number that can be used for both ground and air shipments. The account number is immediately available for shipments for some type of accounts, and if not immediately available, the customer knows when the account will be available for shipments.

The account opening system 10 also has advantages for the account provider. The account opening system avoids the expense of personnel dedicated to entering data and coordinating the use of the backend systems 14. Data entry errors are avoided as the customer inputs their own data into the graphical user interface. In the case of a telephone service center 16, the account opening system coordinates the use of the backend systems 14, minimizing errors and delays in the opening of accounts. Account numbers may still be granted even when backend systems are down, limiting the loss of customers during a scheduled, or unscheduled, interruption of the availability of the backend systems. The above-listed advantages of the account opening system attract additional customers beyond those willing to use conventional systems thereby increasing the number of account subscriptions.

FIGS. 1-17 are block diagrams, flowcharts and control flow illustrations of methods, systems and program products according to the invention. It will be understood that each block or step of the block diagram, flowchart and control flow illustration, and combinations of blocks in the block diagram, flowchart and control flow illustration, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustration support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for facilitating the opening of an account for a customer if an account activation system is unavailable, said account opening system comprising:
   a customer query system configured to prompt the customer to submit customer information and an account opening request if the account activation system is unavailable, said query system further configured to record the submitted customer information and account opening request;
   a pre-validation system configured to receive the customer information from the customer query system and to validate that the customer information is sufficiently correct to allow activation of the account;
   an account number distribution system configured to allocate and distribute an account number identifying the account if the account activation system is unavailable in response to validation of the customer information;
   a cache system capable of receiving and storing the account opening request, the account number and the validated customer information if the account activation system is unavailable and further capable sending the account opening request, the account number and the validated customer information to the account activation system if the account activation system is available; and
   a monitor system that is configured to determine if the account activation system is available and is capable of communicating with the cache system.

2. An account opening system of claim 1, wherein the account number distribution system includes an unique account number repository from which the account number is allocated and distributed.

3. An account opening system of claim 1, further comprising an account recommendation system configured to make an account-type suggestion based on account use information and wherein the customer query system is further configured to prompt the customer for the account use information and to record the account use information submitted by the customer.

4. An account opening system of claim 3, wherein the account-type suggestion is the account-type having minimal cost to the customer.

5. A computer-implemented method for opening an account for a customer if an account activation computer system is unavailable, said method comprising the steps of:
   prompting the customer to submit customer information and an account opening request if the account activation system is unavailable;
   having an account number distribution computer system allocate an account number identifying the account in response to validation of the customer information;
   storing the account opening request, the account number and the validated customer information in a cache system if the account activation system is unavailable;
   determining if the account activation computer system is available and is capable of communicating with the cache system; and
   sending the account opening request, the account number and the validated customer information to the account activation system if the account activation system is available.

6. The method of claim 5, wherein after said prompting step, further comprising recording the customer information and account opening request.

7. The method of claim 6, wherein after said recording step, further comprising validating that the customer information is sufficiently correct to allow activation of the account if the account activation system is unavailable.

8. The method of claim 5, further comprising the step of providing an account-type suggestion based on account use information submitted by the customer.

9. The method of claim 8, wherein providing an account-type suggestion based on account use information submitted by the customer comprises suggesting an account-type having minimal cost to the customer.

10. The method of claim 9, further comprising the step of prompting the customer for the account use information.

11. The method of claim 10, further comprising the step of recording the account use information.

12. The method of claim 5, wherein said allocating step comprises allocating an account number from an account number distribution system which includes an unique account number repository.

* * * * *

UNITED STATES PATENT AND TRADEMARK OFFICE
CERTIFICATE OF CORRECTION

PATENT NO. : 7,577,598 B2
APPLICATION NO. : 10/128825
DATED : August 18, 2009
INVENTOR(S) : Rousseau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2050 days.

Signed and Sealed this

Seventh Day of September, 2010

David J. Kappos
*Director of the United States Patent and Trademark Office*